United States Patent
Greene et al.

[11] Patent Number: 6,117,324
[45] Date of Patent: Sep. 12, 2000

[54] SYSTEM AND PROCESS FOR TREATING ANIMAL WASTE

[75] Inventors: Annel K. Greene; Charles S. Knight, both of Seneca, S.C.

[73] Assignee: Clemson University, Clemson, S.C.

[21] Appl. No.: 09/320,904

[22] Filed: May 27, 1999

[51] Int. Cl.[7] .................................. C02F 3/26; C02F 1/78
[52] U.S. Cl. .......................... 210/627; 210/631; 210/760; 210/916
[58] Field of Search .................................... 210/631, 760, 210/916, 627

[56] References Cited

U.S. PATENT DOCUMENTS

| Re. 22,444 | 2/1944 | Shook . | |
|---|---|---|---|
| 3,459,303 | 8/1969 | Bradley . | |
| 3,485,750 | 12/1969 | Albertson . | |
| 3,577,341 | 5/1971 | Keith et al. . | |
| 3,591,491 | 7/1971 | Smith et al. . | |
| 3,607,737 | 9/1971 | Gamer . | |
| 3,617,537 | 11/1971 | Vermette . | |
| 3,638,793 | 2/1972 | Peck . | |
| 3,660,277 | 5/1972 | McWhirter et al. | 210/760 |
| 3,709,364 | 1/1973 | Salvage . | |
| 3,806,448 | 4/1974 | Smith et al. . | |
| 3,825,494 | 7/1974 | Call et al. . | |
| 3,846,292 | 11/1974 | Lecompte, Jr. . | |
| 3,982,499 | 9/1976 | Frankl | 210/195.1 |
| 4,178,239 | 12/1979 | Lowther | 210/760 |
| 4,214,887 | 7/1980 | Van Gelder | 210/760 |
| 5,078,965 | 1/1992 | Pearson | 210/760 |
| 5,520,888 | 5/1996 | Berndt | 210/760 |
| 5,897,785 | 4/1999 | Billings | 210/760 |

OTHER PUBLICATIONS

Finch, et al., Recovery of a Marker Strain of *Escherichia coli* from Ozonated Water by Membrane Filtration, p. 2894–2896, Dec. 1987, Applied and Environmental Microbiology.

Restaino, et al., Efficacy of Ozonated Water against Various Food–Related Microorganisms, p. 3471–3475, Sep. 1995, Applied and Environmental Microbiology.

Y.H. Chang and B.W. Sheldon, Application of Ozone with Physical Wastewater Treatments to Recondition Poultry Process Waters, p. 1078–1087, Jun. 6, 1988, Journal Series of the North Carolina Agriculature Research Series, Raleigh, NC 27695–7601.

Finch, et al., Comparison of *Giardia Lamblia* and *Giardia muris* Cyst Inactivation by ozone, p. 3674–3680, Nov. 1993, Applied and Environmental Microbiology.

Finch, et al., Ozone Inactivation of *Cryptosporidium parvum* in Demand–Free Phosphate Buffer Determined by In Vitro Excystation and Animal Infectivity, p. 4203–4210, Dec. 1993, Applied and Environmental Microbiology.

(List continued on next page.)

*Primary Examiner*—Thomas G. Wyse
*Attorney, Agent, or Firm*—Dority & Manning, P.A.

[57] ABSTRACT

The present invention is generally directed to a process and system for treating animal waste. More particularly, the present invention is directed to a process and system for treating animal waste effluent with ozone to decompose the organic material within and improve the odor of the animal waste. The process of the present invention also reduces biochemical oxygen demand, chemical oxygen demand, total bacterial content and coliform bacterial count of the animal waste. The process of this present invention comprises collecting an animal waste solution, containing a mixture of water and animal fecal material; contacting the waste solution with ozone in an amount sufficient to oxidize at least a portion of the organic material contained within; and feeding the ozone treated waste solution to a solids separating device prior to collecting the waste solution in a biobasin or, alternatively, recycling the ozone treated waste solution for use as a source of irrigation or flushwater.

20 Claims, 5 Drawing Sheets

OTHER PUBLICATIONS

B.A. Meiners, R.E. Peters and J.B. Mudd, Effects of Ozone on Indole Compounds and Rat Lung Monoamine Oxidase, p. 99–112, 1977, Environmental Research.

Duane L. Peavy and Edward J. Fairchild II, Toxicologic Interactions between Ozone and Bacterial Exdotoxin, p. 63–71, 1987, Environmental Research.

I.Arana, P.Santorum, A.Muela and I.Barcina, Chlorination and ozonation of waste–water:comparative analysis of efficacy through the effect on *Escherichia coli* membranes, p. 883–888, 1999, Journal of Applied Microbiology.

E. Smet & H. Van Longenhove, Abatement of volatile organic sulfur compounds in odorous emissions from bio-industry, Biodegration 9:273–284, 1998.

William A. Feder, Bioassaing for Ozone With Pollen Systems, vol. 37:117–123, Jan. 1981, Environmental Health Prospectives.

Serge Chiron, ANtonio Rodriguez and AMadeo Fernandez–Alba, Application of gas and liquid chromatography–mass spectrometry to the evaluation of pirimiphos methyl degradation products in industrial water under ozone treatment, Journal of Chromatography A, 823:97–107, 1998.

I.R. Komanapalli and B.H.S. Lau, Inactivation of bacteriophage λ, *Escherichia coli,* and *Candida albicans* by ozone, Appl Microbiol Biotechnol, 49:766–769, 1998.

Muela, et al., Discharge of disinfected wastewater in recipient aquatic systems: fate of allochthonous bacterial and autochthonous protozoa populations, Journal of Applied Microbiology, 85:263–270, 1998.

Byun, et al., Gamma irradiation and Ozone Treatment for Inactivation of *Escherichia coli* 0157:H7 in Culture Media, Journal of Food Protection, 61:728–730, 1998.

McKenzie, et al., Aflatoxicosis in Turkey Poults is Prevented by Treatment of Naturally Contaminated Corn with Ozone Generated by Electrolysis, Environment and Health, 1094–1102, 1998.

Klare, et al., Degradation of Nitrogen Containing Organic Compounds by Combined Photocatalysis and Ozonation, Chemosphere, 38:2013–2027, 1999.

Yu, et al., Pretreatment and Biodegradability Enhancement of DSD Acid Manufacturing Wastewater, Chemosphere, 37:487–494, 1998.

Watkins, et al., Ozonation of Swine Manure Wastes to Control Odors And Reduce the Concentrations of Pathogens And Toxic Fermentation Metabolites, Ozone Science & Engineering, 19:425–437, 1997.

SYSTEM AND PROCESS FOR TREATING ANIMAL WASTE

FIELD OF THE INVENTION

The present invention is generally directed to a process and system for treating animal waste. More particularly, the present invention is directed to a process and system for treating animal waste effluent with ozone to decompose the organic material within, sufficiently reduce microorganisms within, and improve the odor of the animal waste.

BACKGROUND OF THE INVENTION

One major dilemma plaguing farmers who raise livestock and/or poultry is the ability to efficiently neutralize and dispose of animal waste. Left untreated, animal waste is a significant health and environmental hazard. Animal waste creates a public nuisance because of its odor, yet improper disposal is associated with significant problems such as water contamination.

In the past, animal waste was typically collected and channeled to a pond or lagoon. Before being emptied into the lagoon, the animal waste may or may not have been separated via mechanical means in order to remove various particulate matter such as sediment. Once fed to the pond or lagoon, the animal waste came in contact with various microorganisms and underwent biodegradation. In particular, the microorganisms were configured to break down the animal waste and reduce BOD, COD, and the total bacterial content of the waste.

Prior art systems, however, have various deficiencies and drawbacks. In particular, these systems did little to initially improve the odor of the waste. Typically, odors originating from the animal waste were only improved or reduced over a substantial amount of time.

Further, these systems tended to work very slowly and would completely fail under some environmental conditions. For instance, under stagnant and hot conditions, the pond or lagoon would fail to adequately biodegrade the waste, overloading the system and creating a very unfavorable situation. Continued deposit of waste into the overloaded system resulted in reduced growth or death of the microorganisms responsible for biodegradation.

As such, a need currently exists for an improved system and process for treating animal waste. In particular, a need currently exists for a process that can safely treat animal waste very rapidly to immediately reduce or otherwise improve the odor that is given off by the waste. A need also exists for a system and process that can very quickly reduce BOD, COD, total bacterial count, and the total coliform count present in animal waste.

SUMMARY OF THE INVENTION

It is an object of the present invention to provide a process and system for treating animal waste.

Another object of the present invention is to provide a process for treating animal waste to improve the odor associated with the animal waste.

Yet another object of the present invention is to provide a process for treating animal waste comprising contacting the animal waste solution with ozone in an amount sufficient to oxidize and decompose organic matter contained in the animal waste solution.

Yet a further object of the present invention is to provide a system and process to treat animal waste such that BOD, COD, total bacterial content and the coliform content of the waste are substantially reduced.

These and other objects of the present invention are achieved by providing a system and process for treating animal waste. The process includes the steps of collecting an animal waste solution containing a mixture of water and animal fecal matter and contacting the animal waste solution with ozone in an amount sufficient to oxidize organic matter contained in the animal waste solution. Specifically, the process for treating animal waste is capable of improving the odor associated with the animal waste. The process of the present invention also reduces BOD, COD, total bacterial content and the coliform content associated with the animal waste. By partially oxidizing the organic matter in route to a lagoon, the process of the present invention also decreases the biodegradation of the microflora in the lagoon.

BRIEF DESCRIPTIONS OF THE FIGURES

A full and enabling disclosure of the present invention, includes reference to the accompanying figures, in which.

Repeat use of reference characters in the present specification and drawings is intended to represent same or analogous features of the invention.

DETAILED DESCRIPTION OF PREFERRED EMBODIMENT

Other objects, features and aspects of the present invention are disclosed in, or are obvious from, the following Detailed Description. It is to be understood by one of ordinary skill in the art that the present discussion is a description of exemplary embodiments only and is not intended as limiting the broader aspects of the present inventions which broader aspects are embodied in the exemplary construction.

In general, the present invention is broadly directed to a process for treating animal waste, such as animal waste produced at animal facilities, farms and livestock production lots. In particular, the system and process of the present invention are directed toward treating animal waste with ozone in an amount sufficient to oxidize organic matter contained in the waste, so that the odor accompanying the animal waste is substantially reduced. Additionally, treatment of animal waste according to the present invention results in a significant reduction in the biochemical oxygen demand (BOD), chemical oxygen demand (COD), total bacteria count, and coliform bacteria count.

Figure 1:
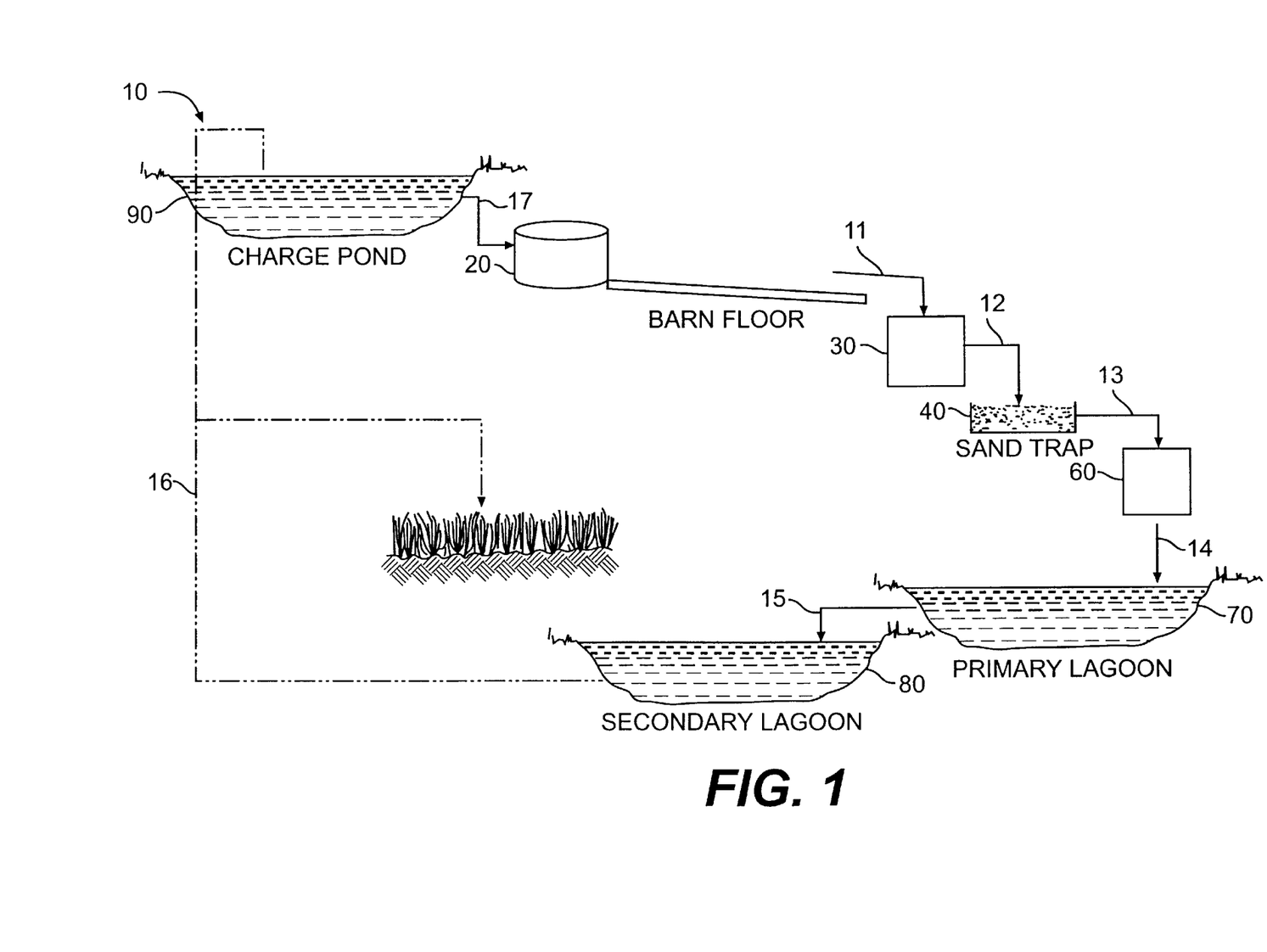
FIG. 1 is a diagrammatical view of an animal waste system made in accordance with the present invention.

One presently preferred embodiment of the present invention is broadly illustrated in FIG. 1. System 10 generally comprises a barn or other animal containment area, flush tank 20, treatment chamber 30, settling device 40, solids separator 60, a first biobasin 70, a second biobasin 80, and charge pond 90. System 10 may further include conduit 11, connecting flush tank 20 to treatment chamber 30; conduit 12, connecting treatment chamber 30 to settling device 40; conduit 13, connecting settling device 40 to solids separator 60; conduit 14, connecting solids separator 60 to first biobasin 70; conduit 15, connecting first biobasin 70 to second biobasin 80; and discharge line 16, connecting second biobasin 80 to charge pond 90.

Animal facilities often use contained areas to house animals for at least a portion of the animal's growth cycle. For example, farming operations, poultry houses and livestock production facilities may segregate some, if not all, of the animals in a barn or other enclosed structure. Likewise, commercial facilities such as dog kennels may breed and house animals in an enclosed structure. Enclosed structures present a problem to the animal caretaker, however, in that excrement and other waste products such as spilled feed, must be discarded. One disposal solution is to flush the floor of the containment area with running water so as to produce an animal waste solution. The animal waste solution is subsequently flushed via a drain into a holding area. Alternately, animal waste may be collected manually and disposed of in a holding area. The animal waste solution in the holding area can be subjected to further treatment, if desired.

Referring now to FIG. 1, a system for animal waste treatment is illustrated. According to the present invention, flush tank 20 can be configured as a tank, a drum, a chamber, a cylinder or in any other shape sufficient to contain fluid within for flushing animal waste from the floor of a barn or other animal containment facility. The tank can be made of various material in accordance with the invention, such as steel, concrete, aluminum, or any other material suitable for holding fluid. The size of the tank can range from about 1 gallon to about 10,000 gallons depending on the size of the operation to be flushed.

In one embodiment contemplated by the present invention, flush tank 20 is associated with an ozonator to provide a source of ozone for treating contaminated water. The ozonator will be described in more detail below.

In a preferred embodiment, flush tank 20 further comprises a mechanism for rapidly releasing flush water. According to the present invention, the mechanism may include a pump sufficient to pump water from tank 20 through conduit 11 to waste treatment chamber 30. Alternately, flush water may be discharged gravitationally from flush tank 20.

In accordance with the present invention, conduit 11, connecting flush tank 20 to treatment chamber 30, may comprise a floor, a pipe, a tube, a channel or any other device suitable for safely transporting a fluid solution from a source to a receptacle. Fluid may be driven through conduit 11 as a result of force generated by a pump or, alternatively, the fluid may be conducted through conduit 11 by gravity. Fluid flowing through conduit 11 flushes animal waste from the animal holding area to treatment chamber 30.

According to the present invention, an animal waste solution is deposited into treatment chamber 30. As described above, the waste solution comprises waste flushed from the floor of an animal containment facility by flush water from flush tank 20 and travels via conduit 11 into treatment chamber 30. In an alternative embodiment, animal waste may be collected from the animal containment area and manually deposited into treatment chamber 30, to be mixed with water from flush tank 20.

Treatment chamber 30 is configured as described above for flush tank 20. Depending upon the amount of animal waste to be treated, treatment chamber 30 ranges in size from about 1 gallon to about 10,000 gallons.

In accordance with the present invention, treatment chamber 30 preferably is associated with an ozonator to provide a source of ozone for waste treatment. In general, an ozonator produces ozone by, for example, applying electricity to air or oxygen resulting in ozone-enriched air. One embodiment of the present invention contemplates an ozonator comprising an ozone generator, but any device which creates ozone from air or oxygen and permits the ozone produced to contact the animal waste solution, such that the ozone reacts with animal waste constituents, is contemplated by the present invention.

As described above, the ozonator of the present invention can include a source of electricity to produce ozone from air or oxygen. Preferably, the electricity source for the ozonator comprises a photoelectric array, however, other sources of electricity useful for producing ozone from air or oxygen are contemplated by the present invention.

In a preferred embodiment, the ozonator includes multiple ports located at or near the bottom of treatment chamber 30, to permit the ozone generated by the ozonator to enter the bottom of chamber 30 to contact the animal waste solution therein.

Waste treatment chamber 30 further includes a mechanical pump, or gravitational transport configured as described above, for pumping fluid from treatment chamber 30 to settling device 40.

Conduit 12, configured as described above for conduit 11, carries post-ozonated animal waste solution from waste treatment chamber 30 to settling device 40. As contemplated by the present invention, settling device 40 may comprise a concrete pad or, alternatively, any suitable clarifier may be used which is configured to slow the flow rate of the post-ozonated waste solution and permit solids to settle out from the waste solution.

As illustrated in FIG. 1, settling device 40 comprises a concrete pad to trap sand and other sediment from the post-ozonated animal waste solution. The post-ozonated animal waste solution is conducted from settling device 40 into solids separator 60 via conduit 13. Conduit 13 is configured as described above for conduit 11. Solids separator 60 separates suspended solids from the animal waste solution, thereby decreasing the contamination of the remaining solution. As encompassed by the present invention, solid separator 60 may comprise a passive filtration system, whereby filtering is accomplished through the application of gravity on the solution, or, in an alternative embodiment, solids separator 60 may further include a pump to drive the waste solution over a filter. However, it should be noted that other means for separating particulate matter from a solution are contemplated by the present invention.

The post-ozonated animal waste solution is conducted from solids separator 60 into first biobasin 70 via conduit 14, configured as described above for conduit 11. First biobasin 70 may comprise a pond, a lagoon, a holding tank or other suitable reservoir for holding fluid. Preferably, first biobasin 70 further includes microorganisms configured to degrade organic matter within the animal waste system.

In accordance with the present invention, the waste solution from first biobasin 70 can be decanted for use in irrigation or, alternatively, conducted via conduit 15 to second biobasin 80. Second biobasin 80 may be configured to contain additional microorganisms to degrade organic components in the waste. In yet another embodiment contemplated by the invention, the waste solution from first biobasin 70 can be recirculated to treatment chamber 30 via conduit 15. Conduit 15 is configured as described above for conduit 11, and may further comprise at least one valve, such that the flow of waste solution can be directed along the desired path.

From second biobasin 80, excess water can be decanted for various uses. Alternatively, the water can be conducted to charge pond 90 via conduit 16. The water in charge pond 90 provides a source of water for flush tank 20 and may be held for an indefinite period until needed. Conduit 16 is configured as described above for conduit 11.

One method for operating the animal waste treatment system of the present invention will now be described. One embodiment of the present invention includes a barn or alternate animal confinement area. Animals confined within the barn produce animal waste, comprising excrement, spilled food, used bedding and the like. In one embodiment of the present invention, water from flush tank 20 mixes with animal waste from the barn floor, making an animal waste solution. Water from flush tank 20 flushes the animal waste solution into treatment chamber 30 via conduit 11. Alternatively, animal waste can be manually deposited into treatment chamber 30, wherein water from flush tank 20 mixes with animal waste to make an animal waste solution.

Treatment chamber 30 is preferably associated with an ozonator, such that ozone is bubbled from the ozonator into chamber 30 to contact the waste solution in an amount sufficient to oxidize at least a portion of any organic material contained in the animal waste solution. The ozone in the ozone-enriched air decomposes organic compounds present in the waste solution. As one of skill in the art will appreciate, the concentration of ozone necessary to treat animal waste is dependant upon a number of variables including: the volume of the treatment chamber; the amount of time animal waste solution is in contact with ozone; the temperature inside the chamber; the presence of ultraviolet light; the presence or absence of agitation; the number of times/day the holding facility is flushed; and the concentration of organic solids in the flushed material.

According to the present invention, the animal waste solution is contacted with ozone for approximately twenty minutes at an ozone concentration of at least about 0.01 ppm; preferably from about 0.1 ppm to about 1.0 ppm; and most preferably from about 0.3 ppm to about 0.5 ppm.

Following ozone treatment, post-ozonated treated animal waste solution is conducted from waste treatment chamber 30 to settling device 40 via conduit 12. Settling device 40 comprises a suitable clarifier which permits the flow rate of the post-ozonated waste solution to be slowed, so that heavy solids settle out from the waste solution. For example, settling device 40 may be a concrete pad, such that passage across the pad may slow the flow rate of the post-ozonated waste solution and permit sand and other particulates to be trapped. Following passage across settling device 40, post-ozonated waste solution is conducted to solids separator 60 via conduit 13. According to one embodiment contemplated by the present invention, post-ozonated waste solution enters the top of settling device 40 through conduit 12 positioned at the top of settling device 40, and exits through conduit 13 positioned at the bottom of settling device 40, thus allowing gravity to facilitate the filtering of the post-ozone treated animal waste solution.

Conduit 13 conducts the post-ozonated waste solution from settling device 40 to solids separator 60, wherein suspended particulate matter is further removed from animal waste solution. Post-ozone treated animal waste solution is conducted from solid separator 60 to first biobasin 70, containing microorganisms configured to biodegrade certain components in the waste solution.

In one embodiment of the present invention, waste solution from first biobasin 70 can be recirculated to treatment chamber 30 via conduit 14. Conduit 14 further comprises a valve. In a first open position, the valve permits the animal waste solution to be recycled from first biobasin 70 to treatment chamber 30 via conduit 14, permitting the waste solution to be sequentially contacted with ozone to further reduce contaminants in the waste solution.

In a second closed position, the valve directs the animal waste solution via conduit 14 to second biobasin 80. Second biobasin 80 may further comprise additional microorganisms, different species or the same as in first biobasin 70, to degrade the organic components contained in the waste solution.

From second biobasin 80, the animal waste solution is decanted through discharge line 16 for further use. For example, the excess water decanted from the post-ozonated animal waste solution can be used for irrigation of farmland or, alternatively, used as a source for the irrigation of public property such as golf courses, parks and the like.

Alternatively, the excess water from the treated animal waste solution exiting from first biobasin 70 or from second biobasin 80 can be discharged into charge pond 90 by means of a conduit system containing at least one valve. The water from charge pond 90 can be fed via conduit 17 into tank 20, thus providing a recirculating source of flush water for the animal waste treatment system.

Figure 2:
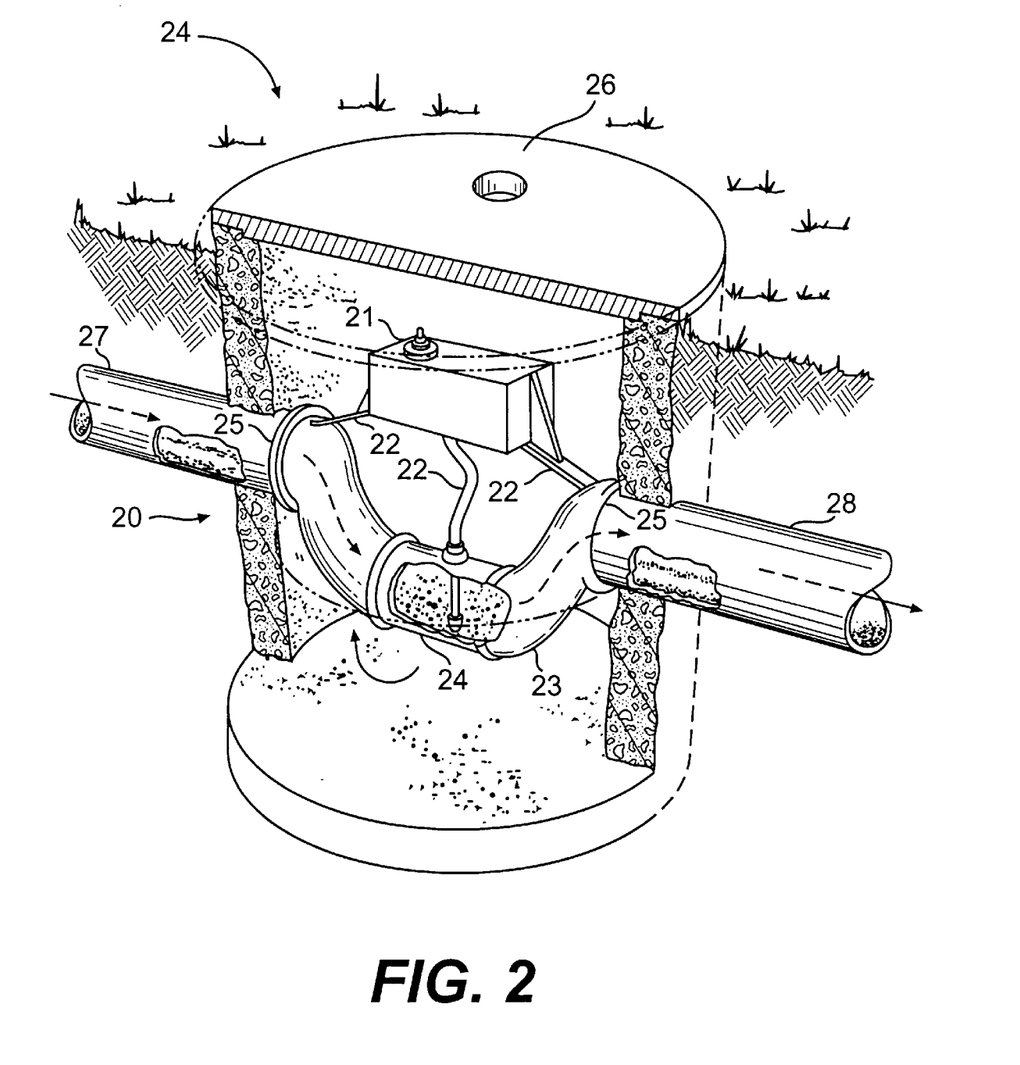
FIG. 2 is a diagrammatical view illustrating an in-line ozonation device made in accordance with the present invention.

Referring now to FIG. 2, an in-line ozonator useful in the present invention is illustrated. In general, the in-line ozonator can be used to replace treatment chamber 30 in the present invention when small volumes of low particle waste water are to be treated. Also contemplated by the present invention is placing an in-line ozonator within at least one conduit used in conjunction with treatment chamber 30. However, it should be appreciated that many other various uses for an in-line ozonator exist. For example, in accordance with the present invention, an in-line ozonator can be placed in a golf course and used to treat irrigation water.

In-line ozonator system 24 broadly comprises ozonator 21, connected to u-shaped tube 23 by at least one connector 22; unshaped tube 23, connected via a first swivel joint 25 to inlet 27 and connected via a second swivel joint 25 to outlet 28; tank 20 and cover 26.

Ozonator 21 preferably comprises an ozone generator to generates ozone from air and/or oxygen and produce ozone-enriched air. Ozonator 21 further includes a source of electricity to produce ozone. Preferably the electricity source comprises a photovoltaic array, however, one of ordinary skill in the art will recognize that other mechanisms for generating electricity may be suitable for use in the present invention. Ozonator 21 is connected to u-shaped tube 23 by at least one connector 22.

As embodied by the present invention, connector 22 may comprise a tube, pipe, channel or other device suitable to allow ozone to enter u-shaped tube 23, permitting ozone to contact the waste solution in an amount sufficient to oxidize at least a portion of any organic material contained in the animal waste solution. In a preferred embodiment, ozonator 21 permanently connects u-shaped tube 23 by connector 22, however, a non-permanent connection between ozonator 21 and u-tube 23 via connector 22 is contemplated by the present invention.

U-shaped tube 23 preferably comprises first and second swivel joint 25. First swivel joint 25 connects u-shaped tube 23 to inlet 27, permitting entry of the animal waste solution into u-shaped tube 23 to contact ozone. Second swivel joint 25 connects unshaped tube 23 to outlet 28, permitting the egress of post-ozonated waste solution.

During waste treatment operation, u-shaped tube 23 is positioned in a first position as shown in FIG. 2, having bottom 24 at the lowest point of u-shaped tube 23. To facilitate flushing and removing of sediment, u-shaped tube 23 can be swivelled into a second position, via first and second swivel joint 25, such that bottom 24 is positioned at highest point of u-shaped tube 23.

As contemplated by the present invention, tank 20 comprises a tank, drum, chamber, or other container suitable for holding unshaped tube 23 and ozonator 21 and having a sufficient diameter to permit u-shaped tube 23 to swivel for operation. Tank 20 further comprises cover 26 permitting access to ozonator system 24.

The present invention may be better understood with reference to the following examples.

EXAMPLE 1

Ozone Treatment of Animal Waste

For each experimental replication, samples of wastewater (about 1 pint each) were collected from the LaMaster Dairy Farm barn flush system(Clemson University, Clemson, S.C.). To ensure a representative sample of barn flushwater was treated, samples were collected from the beginning, middle, and end of a barn flush cycle such that the total volume collected was approximately 1.0 gallon. Samples collected from each timepoint were commingled and immediately transported to the laboratory.

In the lab, samples were thoroughly mixed before treating individual samples (final volume of each sample ranged from about 50 mls to about 2.0 L) according to the present invention.

Ozone, generated by a PUREPOWER ozonator (Longmark Ozone Industriesm Yreka, Calif.), was bubbled through the wastewater samples for 20 minutes at a concentration of from about 0.3 ppm ozone to about 0.4 ppm ozone. Samples of the wastewater, collected in test tubes before and after ozone treatment, were analyzed for biochemical oxygen demand (BOD), chemical oxygen demand (COD), total bacteria count, coliform bacteria count, and for malodorous aromatic compounds by reverse phase chromatography.

EXAMPLE 2

BOD Levels in Post-treated Wastewater

Biochemical Oxygen demand (BOD) was measured by the 5-day BOD test method. Experimental protocols for measuring BOD can be readily obtained from consulting standard reference texts such as Section 5210 B of *Standard Methods for the Examination of Water and Wastewater*, 19th edition, 1995; Eaton, A. D., L. S. Clesceri, and A. E. Greenberg, eds. (American Public Health Association, Washington, D.C.; the contents of which is incorporated in its entirety) without undue experimentation.

Figure 3A:
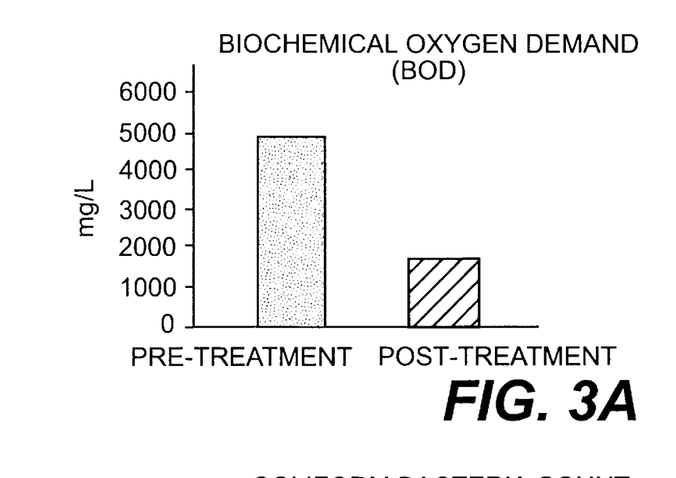
FIG. 3(a) is a graph illustrating the results of biochemical oxygen demand (BOD) and pretreatment waste solution as compared to post treatment waste solution.

FIG. 3A is a graphic illustration comparing the BOD in the wastewater effluent before ozone-treatment to that following treatment according to the present invention. FIG. 3A shows a significant reduction in BOD occurs as a result of treatment, from approximately 5000 mg/L to approximately 1000 mg/L.

EXAMPLE 3

Total Bacteria Count in Post-treated Wastewater

Total aerobic bacteria counts may be determined by using standard experimental methods, such as the aerobic plate count method outlined in chapter 3 of the *FDA Bacteriological Analytical Manual*, 8th edition, 1995 (AOAC International, Gaithersburg, Md.; the contents of which is incorporated in its entirety) without undue experimentation.

Figure 3B:
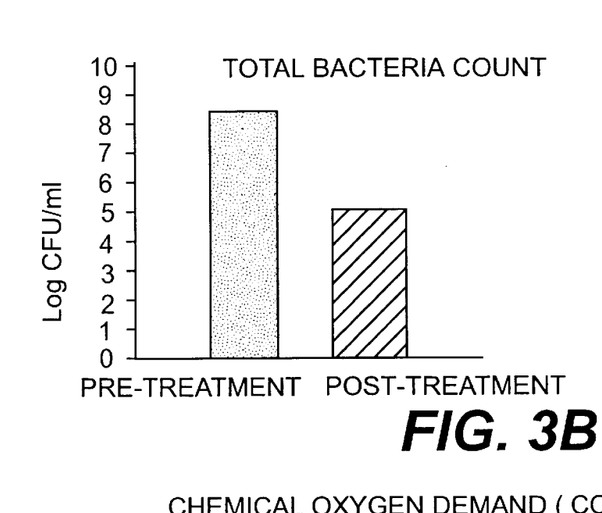
FIG. 3(b) is a graph illustrating the total aerobic bacterial count of the pretreatment waste solution compared to waste solution treated in accordance with the present invention.

FIG. 3B is a graphic illustration comparing the total aerobic bacteria count in the wastewater effluent before ozone-treatment to that following treatment according to the present invention. FIG. 3B shows a significant reduction in total aerobic bacteria count occurs as a result of treatment, from approximately 8 log CFU/ml to approximately 5 log CFU/ml.

EXAMPLE 4

Coliform Bacteria Count in Post-treated Wastewater

Coliform bacteria were enumerated in the before and after samples by using the violet red bile agar (VRBA) solid media method as outlined in chapter 4, section E, of the *FDA Bacteriological Analytical Manual*, 8th edition, 1995 (AOAC International, Gaithersburg, Md.; the contents of which is incorporated in its entirety).

Figure 3C:
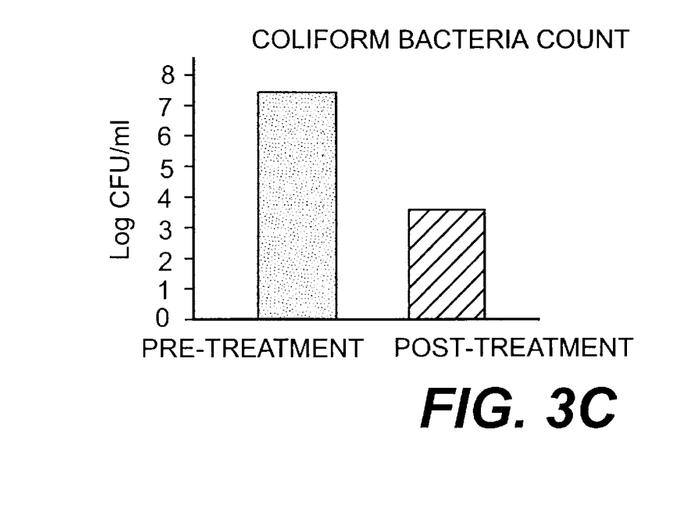
FIG. 3(c) is a graph illustrating the coliform bacteria count in pretreatment waste as compared to waste treated in accordance with the present invention.

FIG. 3C graphically illustrates the number of coliform bacteria present in wastewater before treatment as compared to the coliform bacteria present in samples treated according to the present invention. As can be seen from the graph in FIG. 3C, a significant reduction in coliform counts of about 4 logs occurs following treatment, from approximately 7 log CFU/ml to approximately 3 log CFU/ml.

EXAMPLE 5

COD levels in Post-treated Wastewater

Chemical oxygen demand (COD) was measured by the Closed Reflux, Colimetric Method. Experimental protocols for measuring COD can be readily obtained from consulting standard reference texts such as Section 5220 D of *Standard Methods for the Examination of Water and Wastewater*, 19th edition, 1995; Eaton, A. D., L. S. Clesceri, and A. E. Greenberg, eds. (American Public Health Association, Washington, D.C.; the contents of which is incorporated in its entirety) without undue experimentation.

Figure 3D:
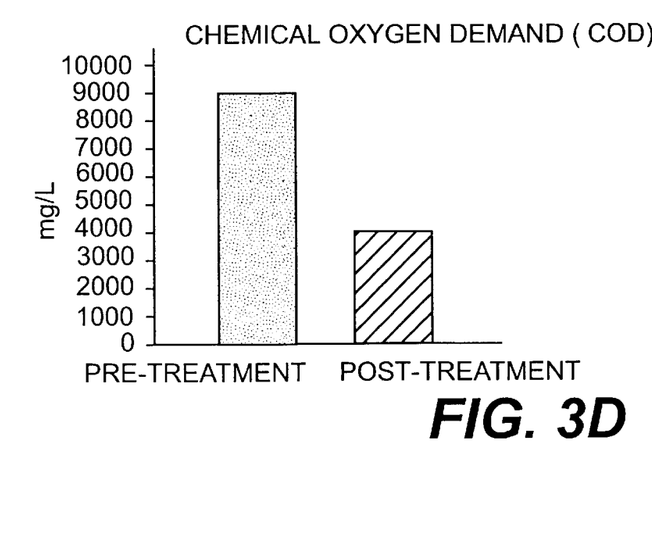
FIG. 3(d) is a graphic illustration of the chemical oxygen demand (COD) in pretreated waste versus waste treated in accordance with the present invention.

FIG. 3D is a graphic illustration comparing the COD in the wastewater effluent before ozone-treatment to that following treatment according to the present invention. FIG. 3D shows a significant reduction in COD occurs as a result of treatment, from approximately 9000 mg/L to approximately 4000 mg/L.

EXAMPLE 6

Levels of Malodorous Aromatic Compounds in Post-treated Wastewater

Malodorous aromatic compounds (indole, skatole, cresol, and the like) were analyzed by high pressure liquid chromatography (HPLC) using a water/acetonitrile gradient and a C5 reverse phase column (Phenomenex, Torrence, Calif.). Detection was at 280 nm using the Rainin gradient DYNAMAX system with MacIntosh computer control and METHOD MANAGER SOFTWARE (Rainin Instrument Co., Woburn, Mass.).

Figure 4:
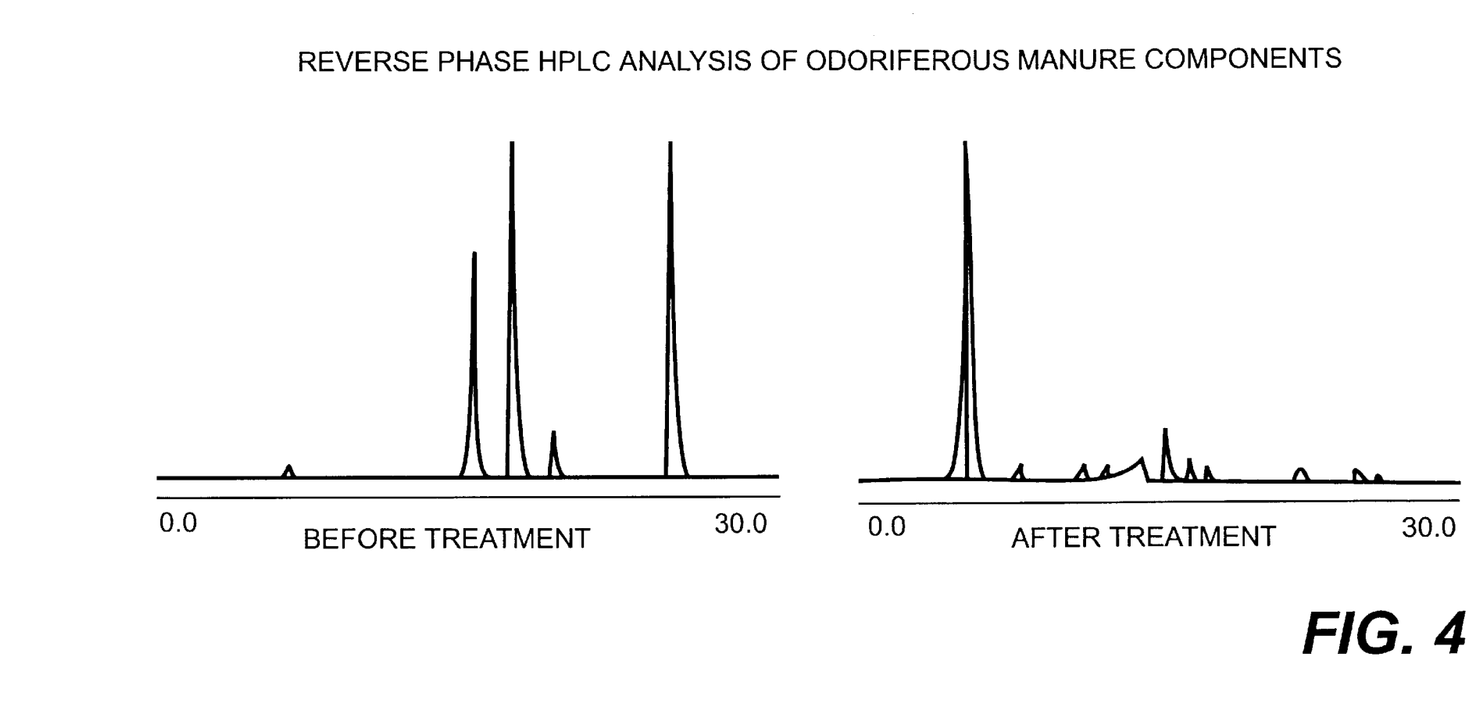
FIG. 4 illustrates reverse phase HPLC analysis of odoriferous manure components in a solution before treatment, as compared to a solution after treatment in accordance with the present invention.

FIG. 4 is a graph illustrating the results of reverse phase high powered liquid chromatography (HPLC) analysis of the components responsible for the odor associated with animal waste. As can be seen in the HPLC graph, following treatment according to the present invention, levels of the odoriferous components are significantly reduced.

Figure 5:
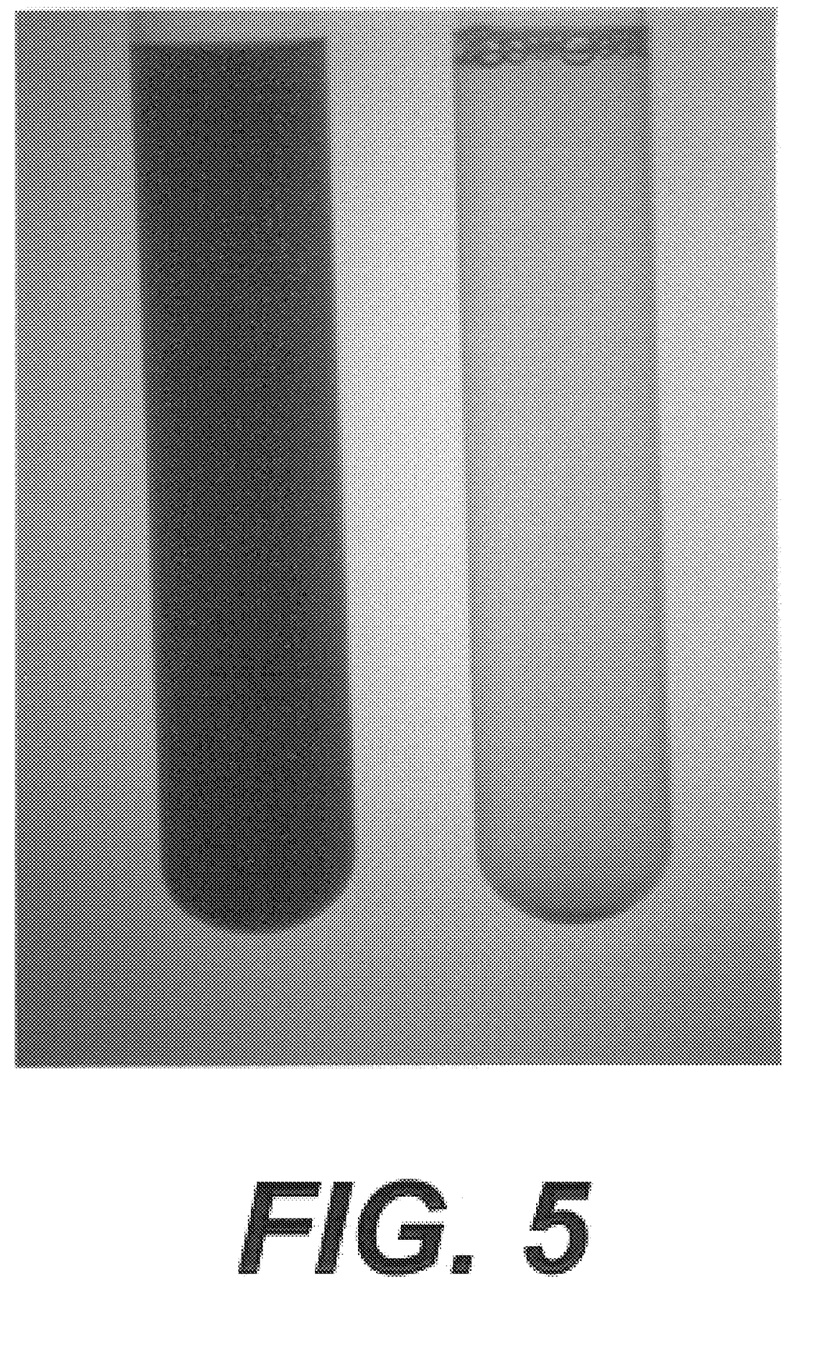
FIG. 5 is a photograph illustrating the appearance of pretreatment waste solution as compared to waste treated in accordance with the present invention.

FIG. 5 is a photograph showing the appearance of wastewater effluent before treatment (5A) as compared to the appearance of effluent treated according to the present invention (5B). FIG. 5 shows that the treated waste solution is clear and colorless as compared to the pre-treated effluent.

Although preferred embodiments of the invention have been described using specific terms, devices, concentrations, and methods, such description is for illustrative purposes only. The words used are words of description rather than of limitation. It is to be understood that changes and variations may be made without departing from the spirit or the scope of the following claims.

What is claimed is:

1. A process for treating animal waste comprising the steps of:

flushing animal waste from an animal confinement area to a treatment chamber, said animal waste being flushed with water thereby forming an animal waste solution;

contacting said animal waste solution with a gas comprising ozone in said treatment chamber, said ozone being present in an amount sufficient to oxidize at least a portion of any organic matter contained in said solution;

feeding said ozone treated animal waste solution to a solids separating device for removing solids from said solution; and thereafter feeding said animal waste solution to a biobasin, said biobasin containing microorganisms configured to biodegrade certain components contained in said animal waste solution.

2. A process as defined in claim 1, wherein said treatment chamber includes a top and a bottom, and wherein said gas comprising ozone is fed to said treatment chamber at a location adjacent to the bottom of said chamber, wherein gas bubbles up through said chamber from said bottom to said top.

3. A process as defined in claim 1, wherein said ozone is contacted with said animal waste solution in an amount sufficient to reduce the COD by at least 5%.

4. A process as defined in claim 1, wherein said ozone is contacted with said animal waste solution in an amount sufficient to reduce the BOD of said solution by at least 5%.

5. A process as defined in claim 1, wherein said ozone is contacted with said animal waste solution in an amount sufficient to reduce the total bacterial count of said solution by at least 5%.

6. A process as defined in claim 1, wherein said ozone is contacted with said animal waste solution in an amount sufficient to reduce the coliform bacterial count of said solution by at least 5%.

7. The process as defined in claim 1, further comprising the step of feeding said ozone treated animal waste solution to a second solids separating device, said first solids separating device being configured to remove sediment from said animal waste solution, said second solid separating device being configured to remove suspended particulate matter from said animal waste solution.

8. A process as defined in claim 1, wherein said ozone is contacted with said animal waste solution at a concentration of at least 0.01 ppm.

9. A process as defined in claim 1, wherein said ozone is contacted with animal waste solution at a concentration from about 0.3 ppm to about 0.5 ppm, said contact occurring for about 5 minutes to about 20 minutes.

10. A process as defined in claim 1, wherein said microorganisms contained in said biobasin biodegrade said components contained within said animal waste solution anaerobically.

11. A process as defined in claim 1, wherein said microorganisms contained in said biobasin biodegrade said components contained within said animal waste solution aerobically.

12. A process as defined in claim 1, further comprising the step of recycling said animal waste solution from said biobasin for use in flushing said animal waste from said animal confinement area to said treatment chamber.

13. A process as defined in claim 12, wherein said recycled animal waste solution is decanted from said biobasin.

14. A process as defined in claim 1, further comprising the step of feeding said animal waste solution from said biobasin to a second biobasin, said second biobasin also containing microorganisms configured to biodegrade certain components contained within said animal waste solution.

15. A process as defined in claim 14, further comprising the step of recycling said animal waste solution from said second biobasin for use of flushing said animal waste from said animal confinement area to said treatment chamber.

16. A process for treating animal waste comprising the steps of:

flushing animal waste from an animal confinement area to a treatment chamber, said animal waste being flushed with water by forming an animal waste solution;

contacting said animal waste solution with a gas comprising ozone in said treatment chamber, said ozone being present in an amount sufficient to oxidize organic matter contained in said solution and to improve the odor of said solution;

feeding said ozone treated animal waste solution to a settling device for removing sediment from said solution;

feeding said ozone treated animal waste solution to a solids separating device configured to remove particulate matter from said solution;

feeding said animal waste solution to a biobasin, said biobasin containing microorganisms configured to biodegrade certain components contained in said animal waste solution; and recycling ozone treated animal waste solution from said biobasin to said animal confinement area for flushing animal waste from said area to said treatment chamber.

17. A process as defined in claim 16, further comprising the step of contacting with animal waste solution contained in said biobasin with further amounts of ozone.

18. A process as defined in claim 16, further comprising the step of feeding said animal waste solution from said biobasin to a second biobasin, said second biobasin also containing microorganisms configured to degrade certain components contained in said animal waste solution, and wherein said cycled animal waste solution fed to said animal confinement area originates from said second biobasin.

19. A process as defined in claim 16, wherein said animal waste solution is aerated in said biobasin.

20. A process for treating animal waste comprising the steps of:

flushing animal waste from an animal confinement area to a treatment chamber, said animal waste being flushed with water thereby forming an animal waste solution;

contacting said animal waste solution with a gas comprising ozone in said treatment chamber, said ozone being present in an amount sufficient to oxidize at least a portion of any organic matter contained in said solution, and thereafter feeding said animal waste solution to a biobasin, said biobasin containing microorganisms configured to biodegrade certain components contained in said animal waste solution.

* * * * *